(12) United States Patent
Kondo

(10) Patent No.: US 12,528,369 B2
(45) Date of Patent: Jan. 20, 2026

(54) ELECTRIC VEHICLE

(71) Applicant: TATSUMI RYOKI CO., LTD, Tokyo (JP)

(72) Inventor: Toyoshi Kondo, Tokyo (JP)

(73) Assignee: TATSUMI RYOKI CO., LTD, Tokyo (JP)

( * ) Notice: Subject to any disclaimer, the term of this patent is extended or adjusted under 35 U.S.C. 154(b) by 304 days.

(21) Appl. No.: 18/571,284

(22) PCT Filed: May 20, 2022

(86) PCT No.: PCT/JP2022/020950
§ 371 (c)(1),
(2) Date: Dec. 18, 2023

(87) PCT Pub. No.: WO2023/286450
PCT Pub. Date: Jan. 19, 2023

(65) Prior Publication Data
US 2024/0286497 A1 Aug. 29, 2024

(30) Foreign Application Priority Data
Jul. 14, 2021 (JP) .................. 2021-116164

(51) Int. Cl.
*B60L 50/60* (2019.01)
*B60L 53/18* (2019.01)
(Continued)

(52) U.S. Cl.
CPC ............... *B60L 50/66* (2019.02); *B60L 53/18* (2019.02); *B60L 58/13* (2019.02); *B60L 58/40* (2019.02)

(58) Field of Classification Search
CPC .......... B60L 50/66; B60L 53/18; B60L 58/13; B60L 58/40; B60L 55/00; B60L 50/75;
(Continued)

(56) References Cited

U.S. PATENT DOCUMENTS

2012/0133322 A1   5/2012  Walsh et al.
2012/0249065 A1*  10/2012  Bissonette ............ B60L 53/665
                                                              320/109
(Continued)

FOREIGN PATENT DOCUMENTS

DE   102010043516 A1 *  5/2012  .............. B60L 53/16
DE   102021201963 A1 *  9/2022  .............. B60L 55/00
(Continued)

OTHER PUBLICATIONS

International Search Report issued in PCT/JP2022/020950 mailed on Jul. 12, 2022 with English Translation (5 pages).
(Continued)

*Primary Examiner* — Hung Q Nguyen
(74) *Attorney, Agent, or Firm* — Nakanishi IP Associates, LLC

(57) ABSTRACT

An electric vehicle includes a first power generation device that generates power, based on natural energy, a first power storage device that stores the power obtained by the first power generation device, an input-side terminal unit that externally receives power supply for charging, a cable that electrically connects the first power storage device and the input-side terminal unit, a second power storage device that stores the power stored in the first power storage device and supplied via the cable and the input-side terminal unit, and a motor that is driven based on the power from the second power storage device.

10 Claims, 1 Drawing Sheet

(51) Int. Cl.
B60L 58/13 (2019.01)
B60L 58/40 (2019.01)

(58) Field of Classification Search
CPC .......... B60L 53/14; B60L 58/12; B60L 58/18; B60L 8/00; B60L 50/60; Y02T 10/7072; Y02T 10/70; H01M 8/04; H01M 10/44; H01M 10/48; H02J 7/35; H02J 7/00; H02J 15/00

See application file for complete search history.

(56) References Cited

U.S. PATENT DOCUMENTS

| | | | |
|---|---|---|---|
| 2013/0113413 A1* | 5/2013 | Harty | H01M 10/465 320/109 |
| 2015/0349582 A1 | 12/2015 | Maeno | |
| 2018/0201142 A1* | 7/2018 | Galin | H02J 3/14 |
| 2024/0286497 A1 | 8/2024 | Kondo | |

FOREIGN PATENT DOCUMENTS

| | | | | |
|---|---|---|---|---|
| JP | 2011-148484 A | 8/2011 | | |
| JP | 2012-515526 A | 7/2012 | | |
| JP | 2015-208132 A | 11/2015 | | |
| JP | 2017-135785 A | 8/2017 | | |
| JP | 2017-175866 A | 9/2017 | | |
| JP | 2018-98093 A | 6/2018 | | |
| JP | 7212428 B | 1/2023 | | |
| WO | WO-2007025096 A1 * | 3/2007 | ................ | H02J 7/35 |
| WO | 2010/083435 A1 | 7/2010 | | |
| WO | WO-2011019855 A1 * | 2/2011 | ......... | G06Q 30/0601 |
| WO | WO-2012053084 A1 * | 4/2012 | ............. | B60L 58/20 |
| WO | 2014/097469 A1 | 6/2014 | | |
| WO | 2023/286450 A1 | 1/2023 | | |

OTHER PUBLICATIONS

Written Opinion of International Searching Authority issued in PCT/JP2022/020950 mailed on Jul. 12, 2022 with English Translation (5 pages).

Office Action issued in Japanese Patent Application No. 2023-000385 mailed on Jul. 28, 2025, with English Translation (12 pages).

Office Action issued in Taiwanese Patent Application No. 111125233 dated Jul. 21, 2025, with English Translation (8 pages).

* cited by examiner

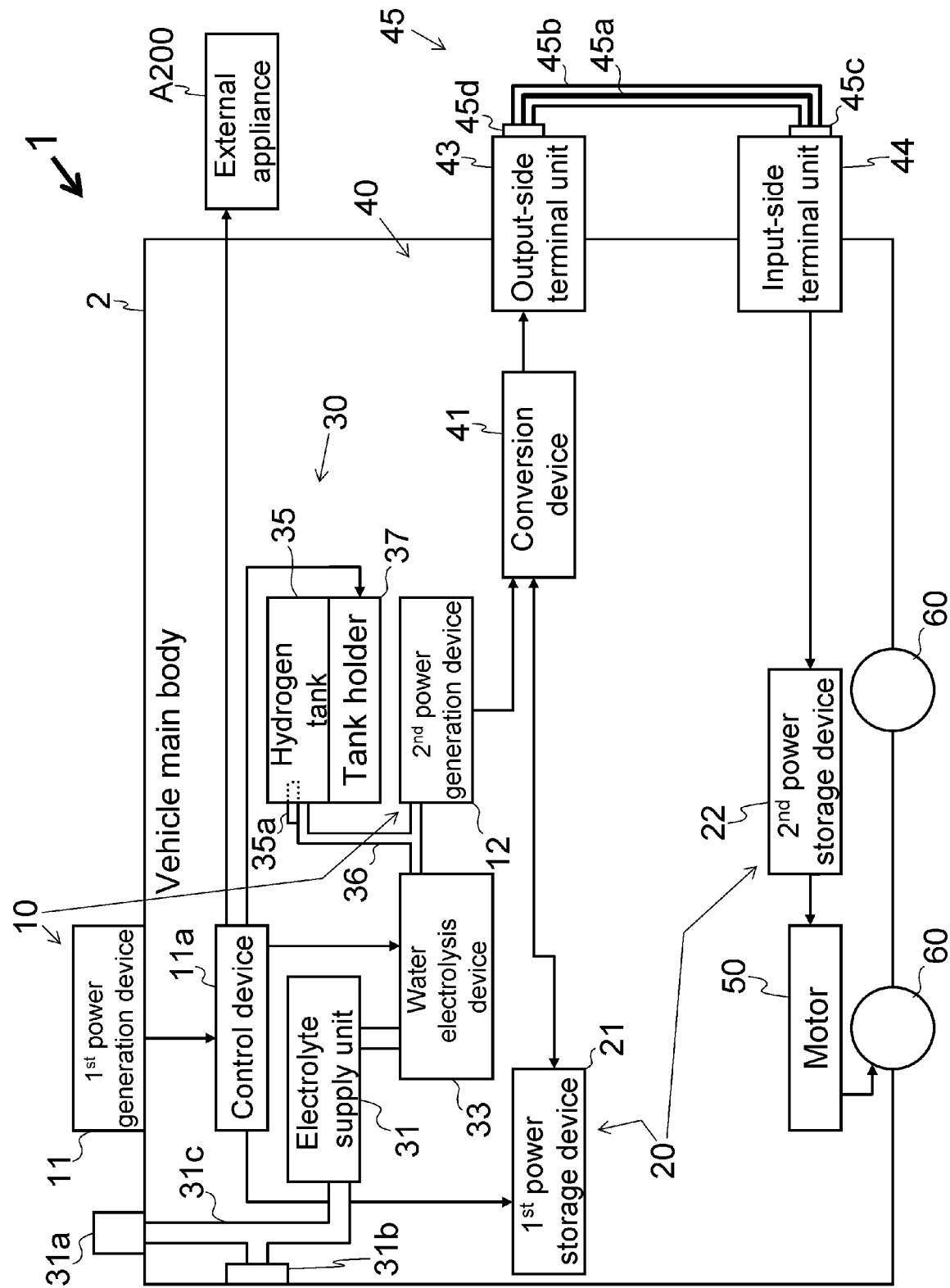

ELECTRIC VEHICLE

TECHNICAL FIELD

The present invention relates to, for example, a power supply device.

BACKGROUND ART

Conventionally, electric automobiles (electric vehicles) have been proposed as disclosed in Patent Literature 1.

CITATION LIST

Patent Literature

Patent Literature 1: JP 2015-208132 A

SUMMARY OF INVENTION

Technical Problem

However, when power is supplied to a drive power storage device for driving a motor while an electric vehicle is traveling, power supply control for the motor becomes complicated.

Hence, an object of the present invention is to provide an electric vehicle that easily ensures power for a power storage device configured to supply power to a motor.

Solutions to Problem

An electric vehicle according to the present invention includes: a first power generation device that generates power, based on natural energy; a first power storage device that stores the power obtained by the first power generation device; an input-side terminal unit that externally receives power supply for charging; a cable that electrically connects the first power storage device and the input-side terminal unit; a second power storage device that stores the power stored in the first power storage device and supplied via the cable and the input-side terminal unit; and a motor that is driven based on the power from the second power storage device.

The first power storage device temporarily stores power. This configuration enables immediate power supply from the first power storage device to the second power storage device via the cable or the like in a case where, for example, a state of charge of the second power storage device is decreased, without complicating control of power supply from the second power storage device to the motor. This configuration thus enables effective use of the first power storage device as a battery for the second power storage device.

The first power storage device and the second power storage device are electrically connected via the cable and the input-side terminal unit. This configuration eliminates erroneous power supply from the first power storage device to the second power storage device unless the cable is connected to the input-side terminal unit. This configuration accordingly enables reduction in occurrence of a possibility that the second power storage device is damaged.

Preferably, a capacity of the first power storage device is larger than an amount of power generated by the first power generation device per day and is smaller than a capacity of the second power storage device.

More preferably, the first power generation device is disposed at least on a roof of the electric vehicle.

The first power storage device is disposed at least in a cargo space of the electric vehicle.

The cable is routed at least outside a vehicle main body of the electric vehicle and is connected to the input-side terminal unit.

The electric vehicle is formed by providing an electric automobile or plug-in hybrid automobile that includes the second power storage device, the input-side terminal unit, and the motor with the first power generation device, the first power storage device, and the cable.

The electric vehicle according to the present invention can be easily formed by merely adding the first power generation device, the first power storage device and the like to an existing electric automobile or plug-in hybrid automobile that includes the second power storage device, the input-side terminal unit, the motor, and wheels.

Power is not directly supplied to the second power storage device, but is supplied via the input-side terminal unit; therefore, there is a low possibility that the first power generation device and the like added to the existing electric automobile or the like adversely affect the control and/or the operation of the second power storage device and/or the motor.

More preferably, the electric vehicle further includes: a hydrogen generation section that generates hydrogen, based on the power obtained by the first power generation device, and stores the hydrogen; and a second power generation device that generates power, based on the hydrogen obtained by the hydrogen generation section.

The second power storage device stores the power stored in the first power storage device and the power obtained by the second power generation device, each power being supplied via the cable and the input-side terminal unit.

The first power storage device temporarily stores power, and the hydrogen generation section stores hydrogen generated based on power. This configuration enables immediate power supply from the first power storage device or from the hydrogen generation section and the second power generation device to the second power storage device via the cable or the like in the case where, for example, the state of charge of the second power storage device is decreased, without complicating the control of power supply from the second power storage device to the motor.

The first power storage device and the hydrogen generation section store power or hydrogen based on power. This configuration therefore enables storage of a larger amount of energy as compared with a configuration that stores only power.

In a case where the electric vehicle is not used for a long period of time, hydrogen is generated based on power obtained by the first power generation device, and a hydrogen tank is filled with the hydrogen. Replacing the hydrogen tank enables effective storage, as hydrogen, of energy obtained by the first power generation device.

In a case where the electric vehicle is used frequently, power is supplied from the first power storage device or from the hydrogen generation section and the second power generation device to the second power storage device via the cable or the like during a stop of the electric vehicle or during an OFF state of an accessory switch. In addition, power is stored in the first power storage device and the hydrogen generation section is filled with hydrogen while the electric vehicle is traveling.

More preferably, the hydrogen generation section includes an electrolyte supply unit and a water electrolysis device.

The electrolyte supply unit includes at least one of a rainwater receiving port that is disposed on an upper surface portion of the vehicle main body of the electric vehicle, and a dehumidifier that is disposed in an interior of the vehicle main body.

Water obtained by at least one of the rainwater receiving port and the dehumidifier is supplied to the water electrolysis device.

Rainwater or water obtained based on moisture in the interior of the electric vehicle is used as an electrolyte. This configuration therefore enables continuous storage of hydrogen even in a state in which external supply of water is small.

More preferably, water resulting from condensation caused by operation of an air conditioner disposed in the electric vehicle is supplied to the water electrolysis device.

More preferably, in a case where a state of charge of the first power storage device is equal to or higher than a first state-of-charge threshold value or in a case where the power is supplied from the first power storage device to the second power storage device via the cable and the input-side terminal unit, control to store the hydrogen in the hydrogen generation section is performed based on the power obtained by the first power generation device.

In a case where the state of charge of the first power storage device is lower than the first state-of-charge threshold value and no power is supplied from the first power storage device to the second power storage device, the power obtained by the first power generation device is supplied to the first power storage device.

This configuration therefore enables reduction in occurrence of a possibility that power externally supplied to the second power storage device while the motor is driven varies the voltage and the like of the second power storage device to adversely affect the control of the motor.

More preferably, the hydrogen generation section includes a hydrogen tank that occludes the hydrogen obtained by the water electrolysis device, and a tank holder that holds the hydrogen tank.

In a case where an internal temperature of the hydrogen tank is equal to or more than a first temperature threshold value and the hydrogen is to be occluded in the hydrogen tank, the tank holder cools the hydrogen tank.

In a case where the internal temperature is less than the first temperature threshold value and the hydrogen is to be occluded in the hydrogen tank, the tank holder does not cool the hydrogen tank.

Power consumption by the tank holder can be reduced in the case where hydrogen can be occluded without cooling the hydrogen tank.

More preferably, in a case where the internal temperature is less than a second temperature threshold value that is higher than the first temperature threshold value and the hydrogen stored in the hydrogen tank is to be released, the tank holder heats the hydrogen tank.

In a case where the internal temperature is equal to or more than the second temperature threshold value and the hydrogen stored in the hydrogen tank is to be released, the tank holder does not heat the hydrogen tank.

Power consumption by the tank holder can be reduced in the case where hydrogen can be released without heating the hydrogen tank.

Preferably, the input-side terminal unit is disposed on a side surface or in an engine room of the vehicle main body of the electric vehicle.

The first power storage device is placed in a trunk of the electric vehicle.

The cable is routed outside the vehicle main body from the trunk and is connected to the input-side terminal unit, with a trunk lid of the electric vehicle opened.

This configuration enables avoidance of power supply to the second power storage device via the cable while the electric vehicle is traveling.

Advantageous Effect of Invention

As described above, according to the present invention, it is possible to provide an electric vehicle that easily ensures power for a power storage device configured to supply power to a motor.

BRIEF DESCRIPTION OF DRAWING

FIG. 1 is a diagram illustrating a configuration of an electric vehicle according to the present embodiment.

DESCRIPTION OF EMBODIMENTS

Hereinafter, the present embodiment will be described with reference to the drawing.

Note that an embodiment is not limited to the following embodiments. In addition, a description of one embodiment is similarly applied to other embodiments in principle. Moreover, embodiments and modifications can be combined appropriately.

(Electric Vehicle 1)

An electric vehicle 1 according to the present embodiment includes a vehicle main body 2, a power generation section 10 (a first power generation device 11, a second power generation device 12), a power storage section 20 (a first power storage device 21, a second power storage device 22), a hydrogen generation section 30 (an electrolyte supply unit 31, a water electrolysis device 33, a hydrogen tank 35, a tank holder 37), a conversion section 40 (a conversion device 41, an output-side terminal unit 43, an input-side terminal unit 44, a cable 45), a motor 50, and wheels 60 (see FIG. 1).

(Vehicle Main Body 2)

The vehicle main body 2 holds the power generation section 10, the power storage section 20, the hydrogen generation section 30, the conversion section 40, and the motor 50.

The electric vehicle 1 is a vehicle in which the motor 50 is driven with power supplied externally or from the first power storage device 21 via the input-side terminal unit 44 to be described later, and the wheels 60 are rotated by at least the drive of the motor 50.

A part of the electric vehicle 1 may be constituted of an existing electric automobile or plug-in hybrid automobile.

In this case, the part of the electric vehicle 1 (the existing electric automobile or plug-in hybrid automobile) includes the second power storage device 22, the input-side terminal unit 44, the motor 50, and the wheels 60.

The electric vehicle 1 according to the present embodiment is formed by adding the first power generation device 11, the first power storage device 21, the cable 45 and the like to said existing electric automobile or plug-in hybrid automobile.

(Power Generation Section 10)

The power generation section 10 includes the first power generation device 11 and the second power generation device 12.

(First Power Generation Device 11)

The first power generation device 11 is a power generation device (a renewable energy-derived power generating device) that generates power, based on natural energy (renewable energy), such as a solar power generation device or a wind power generation device.

The first power generation device 11 is always brought into a state in which the first power generation device 11 is capable generating power.

However, in a case where the first power generation device 11 is a wind power generation device and wind power which the first power generation device 11 receives exceeds predetermined wind power, the first power generation device 11 is brought into a state in which the first power generation device 11 is incapable of generating power.

The first power generation device 11 is placed on an upper surface portion of the vehicle main body 2, such as a roof.

The power obtained by the first power generation device 11 is supplied to the first power storage device 21, the water electrolysis device 33, an external appliance A200 and the like under the control by a control device 11a.

(Control Device 11a)

The control device 11a includes a power conditioner, a distribution switchboard and the like, and performs power supply destination switching control.

Specifically, the control device 11a is connected at its input side to the first power generation device 11.

The control device 11a is connected at its output side to the first power storage device 21, the water electrolysis device 33, and the tank holder 37.

In storing power in the first power storage device 21 based on power obtained by the first power generation device 11, the control device 11a allows supply of the power obtained by the first power generation device 11 to the first power storage device 21.

In storing (occluding) hydrogen in the hydrogen tank 35 based on the power obtained by the first power generation device 11, the control device 11a allows supply of the power obtained by the first power generation device 11 to the water electrolysis device 33 and the tank holder 37.

At this time, the tank holder 37 cools or stops heating the hydrogen tank 35 held thereby.

In releasing the hydrogen stored in the hydrogen tank 35, the control device 11a allows supply of the power obtained by the first power generation device 11 to the tank holder 37.

At this time, the tank holder 37 heats or stops cooling the hydrogen tank 35 held thereby.

The control device 11a is placed, for example, in the vehicle main body 2.

The control device 11a may be connected, via a connection terminal (not illustrated), to an electric appliance (the external appliance A200) outside the electric vehicle 1, such as an electric appliance installed in a building. In this case, the control device 11a subjects the power from one of the first power generation device 11 and the first power storage device 21 to DC/AC conversion and/or converts the power into desired current and voltage, and supplies the resultant to the external appliance A200.

In a case where a state of charge R1 of the first power storage device 21 is equal to or higher than a first state-of-charge threshold value Thr1 (R1≥Thr1, e.g., Thr1=60%) or in a case where power is supplied from the first power storage device 21 to the second power storage device 22 via the cable 45 or the like, the control device 11a causes the hydrogen tank 35 to store (occlude) hydrogen, based on the power obtained by the first power generation device 11.

In a case where the state of charge R1 of the first power storage device 21 is lower than the first state-of-charge threshold value Thr1 (R1<Thr1) and no power is supplied from the first power storage device 21 to the second power storage device 22 via the cable 45 or the like, the control device 11a causes the first power storage device 21 to store power, based on the power obtained by the first power generation device 11.

A determination whether power is supplied from the first power storage device 21 to the second power storage device 22 is made based on, whether the cable 45 is connected to the output-side terminal unit 43, whether current passes through the cable 45 via the output-side terminal unit 43 or the like.

(Control of Operation of Second Power Generation Device 12)

In addition, the control device 11a controls the operation of the second power generation device 12.

Specifically, in a case where the state of charge R1 of the first power storage device 21 is lower than a second state-of-charge threshold value Thr2 (Thr2<Thr1, e.g., Thr2=40%), a state of charge R2 of the second power storage device 22 is lower than the second state-of-charge threshold value Thr2, and a hydrogen filling factor R3 of the hydrogen tank 35 is equal to or higher than a hydrogen filling factor threshold value Thr3, the control device 11a drives the second power generation device 12 (R1<Thr2, R2<Thr2, R3≥Thr3).

The hydrogen filling factor R3 is defined as a ratio of the occlusion amount (cc/g or wt %) of hydrogen with which the hydrogen tank 35 is filled (i.e., hydrogen which a hydrogen occlusion alloy absorbs) to the maximum occlusion amount of hydrogen with which the hydrogen tank 35 can be filled.

The hydrogen filling factor R3 is calculated based on, for example, an expansion coefficient of the hydrogen occlusion alloy detected by a sensing device 35a, such as a distortion sensor, mounted to said hydrogen occlusion alloy of the hydrogen tank 35.

Alternatively, the hydrogen filling factor R3 may be calculated based on the amount of hydrogen flowing into the hydrogen tank 35, the amount of hydrogen discharged from the hydrogen tank 35 or the like, each amount being detected by the sensing device 35a, such as a flow rate sensor, disposed in a communication pipe 36.

(Control of Input to and Output from Conversion Device 41)

In addition, the control device 11a controls input to and output from the conversion device 41.

Specifically, in a case where power is supplied from the first power storage device 21 to the second power storage device 22 via the cable 45 or the like, the control device 11a interrupts input (power supply) from the second power generation device 12 to the conversion device 41.

In a case where power is supplied from the second power generation device 12 to the second power storage device 22 via the cable 45 or the like, the control device 11a interrupts input (power supply) from the first power storage device 21 to the conversion device 41.

(Control of Interruption of Power Supply to Second Power Storage Device 22)

However, in a case where the second power storage device 22 is electrically discharged, for example, in a case where the electric vehicle 1 is traveling, in other words, at least at the time when the second power storage device 22 drives the motor 50, the control device 11a interrupts output (power supply) from the conversion device 41 to the second power storage device 22 via the cable 45 or the like. In this case, no current passes through the cable 45 even when the cable 45 connects the output-side terminal unit 43 and the input-side terminal unit 44.

Note that the interruption of output (power supply) from the conversion device 41 to the second power storage device 22 via the cable 45 or the like may be controlled not only when the electric vehicle 1 is traveling, but also when an accessory switch of the electric vehicle 1 is in an ON state.

(Second Power Generation Device 12)

The second power generation device 12 is a power generation device (fuel cell) that generates power, based on hydrogen.

For example, in a case where the charging state of the second power storage device 22 is insufficient (in a case where the state of charge R2 of the second power storage device 22 is lower than the second state-of-charge threshold value Thr2), the second power generation device 12 is brought into a state in which the second power generation device 12 is capable of generating power.

The second power generation device 12 is placed, for example, inside the vehicle main body 2.

The power obtained by the second power generation device 12 is supplied to the second power storage device 22 via the conversion device 41, the cable 45 and the like under the control by the control device 11a.

Hydrogen to be used in the second power generation device 12 is hydrogen obtained by the water electrolysis device 33 and hydrogen stored in the hydrogen tank 35.

Oxygen to be used in the second power generation device 12 may be oxygen in the air or may be oxygen obtained by the water electrolysis device 33.

(Power Storage Section 20)

The power storage section 20 includes the first power storage device 21 and the second power storage device 22.

(First Power Storage Device 21)

The first power storage device 21 is constituted of a battery or the like, and stores power obtained by the first power generation device 11.

The first power storage device 21 is used for temporarily storing power before the second power storage device 22 is electrically charged, for example, while the electric vehicle 1 is traveling.

The first power storage device 21 may be used for driving an electric appliance, such as the control device 11a, constituting the electric vehicle 1.

In a case where the electric vehicle 1 includes an internal combustion engine such as an engine for rotating the wheels 60, in addition to the motor 50, the power storage section 20 may include a starting battery other than the first power storage device 21 and the second power storage device 22.

Desirably, the first power storage device 21 has a capacity (e.g., 15 kWh) that is about 7.5 times as large as the amount of power generated by the first power generation device 11 per day (e.g., 2 kWh).

Also desirably, the capacity of the first power storage device 21 is about two-third of a capacity (e.g., 24 kWh) of the second power storage device 22 to be described later.

The first power storage device 21 is disposed in a cargo space of the electric vehicle 1 or the like.

The first power storage device 21 may be of a portable type that is removable from the electric vehicle 1 or may be of a fixed type that is fixed to the electric vehicle 1.

The first power storage device 21 may be used for storing power obtained by the second power generation device 12.

For example, in a case where the state of charge R1 of the first power storage device 21 is lower than the second state-of-charge threshold value Thr2, the state of charge R2 of the second power storage device 22 is equal to or higher than the first state-of-charge threshold value Thr1, and the hydrogen filling factor R3 of the hydrogen tank 35 is equal to or higher than the hydrogen filling factor threshold value Thr3, the power obtained by the second power generation device 12 is supplied to the first power storage device 21 via the conversion device 41 or another conversion device (R1<Thr2, R2≥Thr1, R3 Thr3).

(Second Power Storage Device 22)

The second power storage device 22 is constituted of a battery or the like and is used for driving the motor 50, that is, for supplying power to the motor 50.

The second power storage device 22 stores power supplied from an appliance connected via the input-side terminal unit 44. Specifically, in a case where the input-side terminal unit 44 and the output-side terminal unit 43 are connected via the cable 45 or the like, the second power storage device 22 stores the power stored in the first power storage device 21 and the power obtained from the hydrogen stored in the hydrogen tank 35 (the power obtained by the second power generation device 12). In addition, in a case where the input-side terminal unit 44 and an external power source (not illustrated) are connected via the cable 45 or another cable (not illustrated), the second power storage device 22 stores power supplied from said external power source.

(Hydrogen Generation Section 30)

The hydrogen generation section 30 includes the electrolyte supply unit 31, the water electrolysis device 33, and the hydrogen tank 35.

(Electrolyte Supply Unit 31)

The electrolyte supply unit 31 includes a water tank or the like and supplies, to the water electrolysis device 33, an electrolyte such as water for electrolysis.

The electrolyte supply unit 31 also includes a liquid feed pipe 31c and at least one of a rainwater receiving port 31a that is disposed on the upper surface portion of the vehicle main body 2 and a dehumidifier 31b that is disposed in the interior of the vehicle main body 2.

Rainwater collected through the rainwater receiving port 31a or water collected through the dehumidifier 31b is stored in the water tank of the electrolyte supply unit 31 and supplied to the water electrolysis device 33, as an electrolyte via the liquid feed pipe 31c. Note that water obtained outside the electric vehicle 1 by a user or the like of the electric vehicle 1 may be stored in the water tank of the electrolyte supply unit 31 and supplied to the water electrolysis device 33.

Alternatively, a part of an air conditioner of the electric vehicle 1 may function as the dehumidifier 31b, and water resulting from condensation caused by the operation of the air conditioner may be stored in the water tank of the electrolyte supply unit 31 and supplied to the water electrolysis device 33.

The supply of an electrolyte from the water tank of the electrolyte supply unit 31 to the water electrolysis device 33 may be controlled by the control device 11a or may be mechanically controlled such that the amount of an electrolyte inside the water electrolysis device 33 is maintained at a certain level.

(Water Electrolysis Device 33)

The water electrolysis device 33 generates hydrogen through electrolysis of an electrolyte supplied from the electrolyte supply unit 31, based on power supplied from the first power generation device 11 or the like.

The electrolyte supply unit 31 and the water electrolysis device 33 may be provided separately from each other or may be provided integrally with each other.

(Hydrogen Tank 35)

The hydrogen tank 35 includes the hydrogen occlusion alloy that occludes hydrogen, and a container that holds said hydrogen occlusion alloy. Said container of the hydrogen tank 35 holds said hydrogen occlusion alloy thereinside. The hydrogen tank 35 occludes hydrogen at a high pressure or a low temperature, and releases the occluded hydrogen in a state different from said high-pressure or low-temperature state.

The hydrogen tank 35 communicates with the second power generation device 12 and the water electrolysis device 33 via the communication pipe 36.

At least one of the hydrogen tank 35 and the communication pipe 36 is provided with the sensing device 35a including a distortion sensor, a flow rate sensor, a temperature sensor or the like.

The distortion sensor or flow rate sensor of the sensing device 35a is used for calculating a degree of filling of the hydrogen tank 35 with hydrogen (the hydrogen filling factor R3).

The temperature sensor of the sensing device 35a is used for calculating an internal temperature T1 of the hydrogen tank 35.

The tank holder 37 holds the hydrogen tank 35 in a state attachable to and detachable from the tank holder 37.

In addition, the tank holder 37 performs at least one of heating of the hydrogen tank 35 for the purpose of hydrogen release and cooling of the hydrogen tank 35 for the purpose of hydrogen occlusion.

In a case where the internal temperature T1 of the hydrogen tank 35 is equal to or more than a first temperature threshold value Tht1 (e.g., Tht1=0° C.) and hydrogen is to be stored (occluded) in the hydrogen tank 35, the tank holder 37 cools the hydrogen tank 35 (T1 Tht1).

However, in a case where the internal temperature T1 of the hydrogen tank 35 is less than the first temperature threshold value Tht1 since, for example, an outside air temperature is low, and hydrogen is to be stored (occluded) in the hydrogen tank 35, the tank holder 37 does not necessarily cool the hydrogen tank 35 (T1<Tht1).

In a case where the internal temperature T1 of the hydrogen tank 35 is less than a second temperature threshold value Tht2 (Tht1<Tht2, e.g., Tht2=50° C.) and the hydrogen stored in the hydrogen tank 35 is to be released, the tank holder 37 heats the hydrogen tank 35 (T1<Tht2).

However, in a case where the internal temperature T1 of the hydrogen tank 35 is equal to or more than the second temperature threshold value Tht2 since, for example, an outside air temperature is high, and the hydrogen stored in the hydrogen tank 35 is to be released, the tank holder 37 does not necessarily heat the hydrogen tank 35 (T1≥Tht2).

That is, in a case where the internal temperature T1 of the hydrogen tank 35 is equal to or more than the first temperature threshold value Tht1, hydrogen is occluded in the hydrogen tank 35 in a state in which the hydrogen tank 35 is cooled by the tank holder 37.

In a case where the internal temperature T1 of the hydrogen tank 35 is less than the first temperature threshold value Tht1, hydrogen is occluded in the hydrogen tank 35 in a state in which the hydrogen tank 35 is not cooled by the tank holder 37.

In a case where the internal temperature T1 of the hydrogen tank 35 is less than the second temperature threshold value Tht2, the hydrogen is released from the hydrogen tank 35 in a state in which the hydrogen tank 35 is heated by the tank holder 37.

In a case where the internal temperature T1 of the hydrogen tank 35 is equal to or more than the second temperature threshold value Tht2, the hydrogen is released from the hydrogen tank 35 in a state in which the hydrogen tank 35 is not heated by the tank holder 37.

Power consumption by the tank holder 37 can be reduced in the case where hydrogen can be occluded without cooling the hydrogen tank 35 and in the case where hydrogen can be released without heating the hydrogen tank 35.

Note that in the present embodiment, the hydrogen tank 35 is of a portable type, and is described as being attachable to and detachable from the tank holder 37. Alternatively, the hydrogen tank 35 may be fixed to the tank holder 37 or the like without taking attachment and detachment into consideration.

Also in the present embodiment, the hydrogen tank 35 is described as storing hydrogen in such a manner that the hydrogen occlusion alloy occludes the hydrogen. Alternatively, the hydrogen tank 35 may be configured to store one of organic hydride containing hydrogen, hydrogen in a liquefied state, and hydrogen in a compressed gas state.

(Conversion Section 40)

The conversion section 40 includes the conversion device 41, the output-side terminal unit 43, the input-side terminal unit 44, and the cable 45.

(Conversion Device 41)

The conversion device 41 is a charging device that includes an AC/DC converter a DC/DC converter and the like.

The conversion device 41 converts power from the first power storage device 21 into current and voltage suitable for charging of the second power storage device 22, and supplies the current and voltage to the second power storage device 22 via the cable 45 or the like.

The conversion device 41 also converts power from the second power generation device 12 into current and voltage suitable for charging of the second power storage device 22, and supplies the current and voltage to the second power storage device 22 via the cable 45 or the like.

(Quick Charging of Conversion Device 41)

Desirably, the conversion device 41 is a quick charging device that supplies power from one of the first power storage device 21 and the second power generation device 12 to the second power storage device 22 via the cable 45 or the like in a state in which at least one of the current and the voltage is increased, under the control by the control device 11a.

For example, in a case where the state of charge R2 of the second power storage device 22 is equal to or higher than the second state-of-charge threshold value Thr2 and is lower than the first state-of-charge threshold value Thr1, the control device 11a performs said quick charging (Thr2<R2<Thr1).

In addition, in a case where the state of charge R2 of the second power storage device 22 is lower than the second state-of-charge threshold value Thr2 or is equal to or higher than the first state-of-charge threshold value Thr1, the control device 11a does not perform said quick charging, but performs normal charging in a state in which both the voltage and the current are not increased (Thr2>R2 or Thr1 R2).

Alternatively, in a case where the state of charge R2 of the second power storage device 22 is equal to or higher than the first state-of-charge threshold value Thr1, the control device 11a may perform neither said quick charging nor said normal charging.

(Application Example of Conversion Device 41)

In the present embodiment, an example has been described, in which the conversion device 41 is disposed between the output-side terminal unit 43 and the first power storage device 21. Alternatively, the conversion device 41 may be disposed between the second power storage device 22 and the input-side terminal unit 44 in place of/in addition to the configuration in which the conversion device 41 is disposed between the output-side terminal unit 43 and the first power storage device 21.

(Output-Side Terminal Unit 43, Input-Side Terminal Unit 44, Cable 45)

The output-side terminal unit 43 is an output terminal for supplying power from the first power storage device 21 or the second power generation device 12.

The input-side terminal unit 44 is an input terminal for supplying power to the second power storage device 22 (for receiving power supply from the outside, the first power storage device 21, or the second power generation device 12, for the purpose of charging). The input-side terminal unit 44 is disposed, for example, on a side surface or in an engine room of the vehicle main body 2. Therefore, in a case where the first power storage device 21 and the conversion device 41 are placed in a trunk, the cable 45 is routed outside the vehicle main body 2 from the trunk and is connected to the input-side terminal unit 44 with a trunk lid opened (there is a low possibility that wiring can be made while the electric vehicle 1 is traveling).

The cable 45 is an electric cable for electrically connecting the output-side terminal unit 43 and the input-side terminal unit 44.

The cable 45 is, for example, a coaxial cable or the like, and includes an electric line 45a, a cover portion 45b covering said electric line 45a, a first terminal portion 45c connected to the input-side terminal unit 44, and a second terminal portion 45d connected to the output-side terminal unit 43. The electric line 45a is constituted of an inner conductor, an insulator covering said inner conductor, and an outer conductor covering said insulator. The cover portion 45b covers said outer conductor.

However, the cable 45 is not limited to a coaxial cable. For example, the electric line 45a may include a positive inner conductor and a negative inner conductor that is disposed in parallel with said positive inner conductor with an insulator interposed therebetween, and these components may be covered with the cover portion 45b.

Alternatively, the conversion device 41 and the cable 45 may be directly connected without interposition of the output-side terminal unit 43. In this case, the second terminal portion 45d is omitted.

(Motor 50, Wheels 60)

The motor 50 is driven based on power from the second power storage device 22 to rotate the wheels 60 of the electric vehicle 1.

(Advantageous Effect of Provision of First Power Storage Device 21 and Second Power Storage Device 22)

The first power storage device 21 temporarily stores power. This configuration enables immediate power supply from the first power storage device 21 to the second power storage device 22 via the cable 45 or the like in a case where, for example, the state of charge R2 of the second power storage device 22 is decreased, without complicating control of power supply from the second power storage device 22 to the motor 50. This configuration thus enables effective use of the first power storage device 21 as a battery (an auxiliary power source) for the second power storage device 22.

(Advantageous Effect of Power Supply to Second Power Storage Device 22 Via Cable 45 and Input-Side Terminal Unit 44)

The first power storage device 21 and the second power storage device 22 are electrically connected via the cable 45 and the input-side terminal unit 44. This configuration eliminates erroneous power supply from the first power storage device 21 to the second power storage device 22 unless the cable 45 is connected to the input-side terminal unit 44. This configuration accordingly enables reduction in occurrence of a possibility that the second power storage device 22 that is fixed to and is therefore less likely to be detached from the vehicle main body 2 is damaged.

(Advantageous Effect of Utilization of Existing Electric Automobile, Etc.)

The electric vehicle 1 according to the present embodiment can be easily formed by merely adding the first power generation device 11, the first power storage device 21 and the like to an existing electric automobile or plug-in hybrid automobile that includes the second power storage device 22, the input-side terminal unit 44, the motor 50, and the wheels 60.

Power is not directly supplied to the second power storage device 22, but is supplied via the input-side terminal unit 44; therefore, there is a low possibility that the first power generation device 11 and the like added to the existing electric automobile or the like adversely affect the control and/or the operation of the second power storage device 22 and/or the motor 50.

(Advantageous Effect of Provision of Hydrogen Generation Section 30)

The first power storage device 21 temporarily stores power, and the hydrogen generation section 30 stores hydrogen generated based on power. This configuration enables immediate power supply from the first power storage device 21 or from the hydrogen generation section 30 and the second power generation device 12 to the second power storage device 22 via the cable 45 or the like in a case where, for example, the state of charge R2 of the second power storage device 22 is decreased, without complicating control of power supply from the second power storage device 22 to the motor 50.

The first power storage device 21 and the hydrogen generation section 30 store power or hydrogen based on power. This configuration therefore enables storage of a larger amount of energy as compared with a configuration that stores only power.

In a case where the electric vehicle 1 is not used for a long period of time, hydrogen is generated based on power obtained by the first power generation device 11, and the hydrogen tank 35 is filled with the hydrogen. Replacing the hydrogen tank 35 enables effective storage, as hydrogen, of energy obtained by the first power generation device 11.

In a case where the electric vehicle 1 is used frequently, power is supplied from the first power storage device 21 or from the hydrogen generation section 30 and the second power generation device 12 to the second power storage device 22 via the cable 45 or the like during a stop of the electric vehicle 1 or during an OFF state of the accessory switch. In addition, power is stored in the first power storage device 21 and the hydrogen generation section 30 is filled with hydrogen while the electric vehicle 1 is traveling.

(Advantageous Effect of Use of Rainwater, Etc. As Electrolyte)

Rainwater or water obtained based on moisture in the interior of the electric vehicle is used as an electrolyte. This configuration therefore enables continuous storage of hydrogen even in a state in which external supply of water is small.

(Advantageous Effect of Power Supply Interruption Control for Second Power Storage Device 22)

This configuration therefore enables reduction in occurrence of a possibility that power externally supplied to the second power storage device 22 while the motor 50 is driven varies the voltage and the like of the second power storage device 22 to adversely affect the control of the motor 50.

Although some embodiments of the present invention have been described, these embodiments are presented as examples and are not intended to limit the scope of the invention. These embodiments can be implemented in other various forms, and various omissions, substitutions, and changes can be made without departing from the gist of the invention. These embodiments and modifications thereof are included in the scope and gist of the invention and are also included in the invention recited in the claims and the equivalent scope thereof.

REFERENCE SIGNS LIST

1 Electric vehicle
2 Vehicle main body
10 Power generation section
11 First power generation device
11a Control device
12 Second power generation device
20 Power storage section
21 First power storage device
22 Second power storage device
30 Hydrogen generation section
31 Electrolyte supply unit
31a Rainwater receiving port
31b Dehumidifier
31c Liquid feed pipe
33 Water electrolysis device
35 Hydrogen tank
35a Sensing device
36 Communication pipe
37 Tank holder
40 Conversion section
41 Conversion device
43 Output-side terminal unit
44 Input-side terminal unit
45 Cable
45a Electric line
45b Cover portion
45c First terminal portion
45d Second terminal portion
50 Motor
60 Wheel
A200 External appliance (external electric appliance)
R1 State of charge of first power storage device
R2 State of charge of second power storage device
R3 Hydrogen filling factor of hydrogen tank
T1 Internal temperature of hydrogen tank
Thr1 First state-of-charge threshold value (full charging)
Thr2 Second state-of-charge threshold value
Thr3 Hydrogen filling factor threshold value
Tht1 First temperature threshold value
Tht2 Second temperature threshold value

The invention claimed is:

1. An electric vehicle comprising:
a first power generation device that generates power, based on natural energy;
a first power storage device that stores the power obtained by the first power generation device;
an input-side terminal unit that externally receives power supply for charging;
a cable that electrically connects the first power storage device and the input-side terminal unit;
a second power storage device that stores the power stored in the first power storage device and supplied via the cable and the input-side terminal unit; and
a motor that is driven based on the power from the second power storage device.

2. The electric vehicle according to claim 1, wherein
a capacity of the first power storage device is larger than an amount of power generated by the first power generation device per day and is smaller than a capacity of the second power storage device.

3. The electric vehicle according to claim 1, wherein
the first power generation device is disposed at least on a roof of the electric vehicle,
the first power storage device is disposed at least in a cargo space of the electric vehicle,
the cable is routed at least outside a vehicle main body of the electric vehicle and is connected to the input-side terminal unit, and
the electric vehicle is formed by providing an electric automobile or plug-in hybrid automobile that includes the second power storage device, the input-side terminal unit, and the motor with the first power generation device, the first power storage device, and the cable.

4. The electric vehicle according to claim 1, further comprising:
a hydrogen generation section that generates hydrogen, based on the power obtained by the first power generation device, and stores the hydrogen; and
a second power generation device that generates power, based on the hydrogen obtained by the hydrogen generation section,
wherein
the second power storage device stores the power stored in the first power storage device and the power obtained by the second power generation device, each power being supplied via the cable and the input-side terminal unit.

5. The electric vehicle according to claim 4, wherein
the hydrogen generation section includes an electrolyte supply unit and a water electrolysis device,
the electrolyte supply unit includes at least one of a rainwater receiving port that is disposed on an upper surface portion of a vehicle main body of the electric vehicle and a dehumidifier that is disposed in an interior of the vehicle main body, and
water obtained by at least one of the rainwater receiving port and the dehumidifier is supplied to the water electrolysis device.

6. The electric vehicle according to claim 5, wherein
water resulting from condensation caused by operation of an air conditioner disposed in the electric vehicle is supplied to the water electrolysis device.

7. The electric vehicle according to claim 5, wherein
in a case where a state of charge of the first power storage device is equal to or higher than a first state-of-charge threshold value or in a case where the power is supplied from the first power storage device to the second power storage device via the cable and the input-side terminal unit, control to store the hydrogen in the hydrogen generation section is performed based on the power obtained by the first power generation device, and in a case where the state of charge of the first power storage device is lower than the first state-of-charge threshold value and no power is supplied from the first power storage device to the second power storage device, the power obtained by the first power generation device is supplied to the first power storage device.

8. The electric vehicle according to claim 5, wherein the hydrogen generation section includes a hydrogen tank that occludes the hydrogen obtained by the water electrolysis device, and a tank holder that holds the hydrogen tank, in a case where an internal temperature of the hydrogen tank is equal to or more than a first temperature threshold value and the hydrogen is to be occluded in the hydrogen tank, the tank holder cools the hydrogen tank, and in a case where the internal temperature is less than the first temperature threshold value and the hydrogen is to be occluded in the hydrogen tank, the tank holder does not cool the hydrogen tank.

9. The electric vehicle according to claim 8, wherein in a case where the internal temperature is less than a second temperature threshold value that is higher than the first temperature threshold value and the hydrogen stored in the hydrogen tank is to be released, the tank holder heats the hydrogen tank, and in a case where the internal temperature is equal to or more than the second temperature threshold value and the hydrogen stored in the hydrogen tank is to be released, the tank holder does not heat the hydrogen tank.

10. The electric vehicle according to claim 1, wherein the input-side terminal unit is disposed on a side surface or in an engine room of a vehicle main body of the electric vehicle, the first power storage device is placed in a trunk of the electric vehicle, and the cable is routed outside the vehicle main body from the trunk and is connected to the input-side terminal unit, with a trunk lid of the electric vehicle opened.

* * * * *